United States Patent
Wu et al.

(10) Patent No.: US 10,583,691 B2
(45) Date of Patent: Mar. 10, 2020

(54) POLYMER COMPOSITIONS HAVING IMPROVED EMI RETENTION

(75) Inventors: Tong Wu, Shanghai (CN); Will Li, Shanghai (CN); David Zou, Shanghai (CN)

(73) Assignee: SABIC Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 13/405,774

(22) Filed: Feb. 27, 2012

(65) Prior Publication Data

US 2013/0221282 A1 Aug. 29, 2013

(51) Int. Cl.
*B60B 39/02* (2006.01)
*H01B 1/22* (2006.01)
*B60B 39/04* (2006.01)

(52) U.S. Cl.
CPC ............ *B60B 39/021* (2013.01); *B60B 39/04* (2013.01); *B60B 2900/721* (2013.01); *H01B 1/22* (2013.01)

(58) Field of Classification Search
CPC ........................................................ H01B 1/22
USPC ................................................. 252/511, 506
See application file for complete search history.

(56) References Cited

U.S. PATENT DOCUMENTS

| | | | |
|---|---|---|---|
| 2,465,319 A * | 3/1949 | Whinfield et al. | 526/71 |
| 4,260,693 A * | 4/1981 | Liu | 525/148 |
| 4,272,429 A * | 6/1981 | Jones | C07C 43/29 524/538 |
| 4,596,670 A * | 6/1986 | Liu | 252/511 |
| 4,636,536 A * | 1/1987 | Kamiyo et al. | 523/137 |
| 4,826,913 A * | 5/1989 | Nelson | 524/490 |
| 4,891,399 A | 1/1990 | Ohkawa et al. | |
| 5,034,157 A * | 7/1991 | Merrell et al. | 252/512 |
| 5,504,139 A * | 4/1996 | Davies et al. | 524/504 |
| 6,046,141 A * | 4/2000 | Kurz et al. | 508/100 |
| 6,046,300 A * | 4/2000 | Umetsu et al. | 528/176 |
| 2002/0108699 A1* | 8/2002 | Cofer | C03C 25/26 156/176 |
| 2003/0173550 A1 | 9/2003 | Fox et al. | |
| 2004/0030021 A1* | 2/2004 | Mitsunaga et al. | 524/442 |
| 2007/0105994 A1 | 5/2007 | Li et al. | |
| 2008/0251769 A1* | 10/2008 | Li | C08K 7/04 252/513 |
| 2009/0226696 A1* | 9/2009 | Simpson | C08J 9/0066 428/304.4 |
| 2009/0236565 A1* | 9/2009 | Mercx et al. | 252/511 |
| 2010/0040902 A1* | 2/2010 | Mizrahi | 428/600 |
| 2010/0282746 A1* | 11/2010 | Negandhi et al. | 220/4.14 |

FOREIGN PATENT DOCUMENTS

WO WO-1984/01783 A1 5/1984

OTHER PUBLICATIONS

International Search Report and Written Opinion dated Feb. 28, 2013 for International Patent Application No. PCT/IB2012/056883, filed Nov. 30, 2012 [Applicant—Sabic Innovative Plastics IP B.V. // pp. 1-13 // PCT Counterpart].

* cited by examiner

*Primary Examiner* — William D Young
(74) *Attorney, Agent, or Firm* — Baker Hostetler (57) ABSTRACT

Polymer compositions having improved electromagnetic (EMI) shielding properties under high temperature are disclosed. The polymer compositions comprise a thermoplastic polymer, stainless steel fiber, and optionally one or more of glass fiber, a conductive filler, a second polymer, and other additives. The disclosed compositions maintain heat resistance and other mechanical properties under high temperatures.

7 Claims, 4 Drawing Sheets

POLYMER COMPOSITIONS HAVING IMPROVED EMI RETENTION

TECHNICAL BACKGROUND

Thermoplastics, such as, for example, polybutylene terephthalate (PBT), are frequently used as insulators in electrical applications. In such applications, glass fiber is typically added to semi-crystalline materials, such as, for example, PBT materials, to maintain or improve dimensional stability under high temperatures. Unfortunately, the addition of glass fiber also results in diminished electromagnetic shielding performance.

Accordingly, there remains a need for thermoplastic materials that can provide improved electromagnetic shielding properties under high temperatures while maintaining heat resistance and other mechanical properties. These needs and other needs are satisfied by the compositions and methods of the present disclosure.

SUMMARY

In accordance with the purpose(s) of the invention, as embodied and broadly described herein, this disclosure, in one aspect, relates to polymer compositions having improved electromagnetic shielding properties.

In one aspect, the present disclosure provides a polymer composition comprising: from about 20 wt. % to about 50 wt. % of a thermoplastic polymer; from about 5 wt. % to about 30 wt. % of a stainless steel fiber; from about 0 wt. % to about 15 wt. % of a conductive filler; from about 0 wt. % to about 30 wt. % of glass fiber; from about 0 wt. % to about 15 wt. % of a second polymer; and from about 0 wt. % to about 15 wt. % of one or more additives.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE FIGURES

The accompanying figures, which are incorporated in and constitute a part of this specification, illustrate several aspects and together with the description serve to explain the principles of the invention.

DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited.

Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, example methods and materials are now described.

As used in the specification and the appended claims, the singular forms "a," "an" and "the" include plural referents unless the context clearly dictates otherwise. Thus, for example, reference to "a ketone" includes mixtures of two or more ketones.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance can or can not occur, and that the description includes instances where said event or circumstance occurs and instances where it does not. For example, the phrase "optionally substituted alkyl" means that the alkyl group can or can not be substituted and that the description includes both substituted and unsubstituted alkyl groups.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article, denote the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —$OCH_2CH_2O$— units in the polyester, regardless of whether ethylene glycol was used to prepare the polyester. Similarly, a sebacic acid residue in a polyester refers to one or more —$CO(CH_2)_8CO$— moieties in the polyester, regardless of whether the residue is obtained by reacting sebacic acid or an ester thereof to obtain the polyester.

The term "alkyl group" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "alkoxy" as used herein is an alkyl group bound through a single, terminal ether linkage; that is, an "alkoxy" group can be defined as —OR where R is alkyl as defined above. A "lower alkoxy" group is an alkoxy group containing from one to six carbon atoms.

The term "alkenyl group" as used herein is a hydrocarbon group of from 2 to 24 carbon atoms and structural formula containing at least one carbon-carbon double bond. Asymmetric structures such as (AB)C=C(CD) are intended to include both the E and Z isomers. This can be presumed in structural formulae herein wherein an asymmetric alkene is present, or it can be explicitly indicated by the bond symbol C.

The term "alkynyl group" as used herein is a hydrocarbon group of 2 to 24 carbon atoms and a structural formula containing at least one carbon-carbon triple bond.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "cycloalkyl group" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl group" is a cycloalkyl group as defined above where at least one of the carbon atoms of the ring is substituted with a heteroatom such as, but not limited to, nitrogen, oxygen, sulphur, or phosphorus.

The term "aralkyl" as used herein is an aryl group having an alkyl, alkynyl, or alkenyl group as defined above attached to the aromatic group. An example of an aralkyl group is a benzyl group.

The term "hydroxyalkyl group" as used herein is an alkyl, alkenyl, alkynyl, aryl, aralkyl, cycloalkyl, halogenated alkyl, or heterocycloalkyl group described above that has at least one hydrogen atom substituted with a hydroxyl group.

The term "alkoxyalkyl group" is defined as an alkyl, alkenyl, alkynyl, aryl, aralkyl, cycloalkyl, halogenated alkyl, or heterocycloalkyl group described above that has at least one hydrogen atom substituted with an alkoxy group described above.

The term "ester" as used herein is represented by the formula —C(O)OA, where A can be an alkyl, halogenated alkyl, alkenyl, alkynyl, aryl, heteroaryl, cycloalkyl, cycloalkenyl, heterocycloalkyl, or heterocycloalkenyl group described above.

The term "carbonate group" as used herein is represented by the formula —OC(O)OR, where R can be hydrogen, an alkyl, alkenyl, alkynyl, aryl, aralkyl, cycloalkyl, halogenated alkyl, or heterocycloalkyl group described above.

The term "carboxylic acid" as used herein is represented by the formula —C(O)OH.

The term "aldehyde" as used herein is represented by the formula —C(O)H.

The term "keto group" as used herein is represented by the formula —C(O)R, where R is an alkyl, alkenyl, alkynyl, aryl, aralkyl, cycloalkyl, halogenated alkyl, or heterocycloalkyl group described above.

The term "carbonyl group" as used herein is represented by the formula C=O.

The term "ether" as used herein is represented by the formula $AOA^1$, where A and $A^1$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "sulfo-oxo group" as used herein is represented by the formulas —$S(O)_2R$, —$OS(O)_2R$, or, —$OS(O)_2OR$, where R can be hydrogen, an alkyl, alkenyl, alkynyl, aryl, aralkyl, cycloalkyl, halogenated alkyl, or heterocycloalkyl group described above.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

As briefly described above, the present disclosure provides polymer materials, such as, for example, thermoplastic polymer materials, that have improved electromagnetic shielding properties. Current market demand exists for thermoplastic materials having improved retention of electromagnetic interference (EMI) properties under high temperatures.

Conventional thermoplastic materials are frequently mixed with glass fiber to impart dimensional stability under high temperatures, but the addition of glass fiber typically reduces the electromagnetic shielding properties of the material.

The present invention comprises a polymer composition comprising a thermoplastic polymer, stainless steel fiber, and optionally one or more of glass fiber, a conductive filler, a second polymer, and other additives. In one aspect, the inventive polymer composition exhibits improved EMI retention under high temperatures and while maintaining one or more desirable physical properties. In another aspect, the inventive polymer composition is suitable for use in automotive applications. In another aspect, the second polymer is a crystalline or semicrystalline polymer. In various aspects, semi-crystalline polymers can provide good surface properties, flow ability, and high stiffness, as compared to amorphous polymer materials, such as polycarbonate; however, such semi-crystalline polymer materials typically exhibit drops in EMI performance after annealing and/or aging due to changes in the crystalline structure of the material. Thus, the present invention provides improved methods and compositions to minimize and/or eliminate EMI drop in semi-crystalline polymer materials.

Thermoplastic Polymer

The polymer composition comprises a thermoplastic polymer. In one aspect, the thermoplastic polymer can comprise any thermoplastic polymer or mixture of polymers suitable for use in the polymer composition or in an intended application. In one aspect, the thermoplastic polymer comprises a crystalline or semi-crystalline polymer. In another aspect, the thermoplastic polymer can comprise a polybutylene therephthalate, a polyphthalamide, nylon, or a combination thereof. In another aspect, the thermoplastic polymer comprises a polyester. In a specific aspect, the thermoplastic comprises polybutylene terephthalate (PBT) and/or a derivative thereof, such as, for example, a Valox® polybutylene terephthalate, available from SABIC Innovative Plastics.

In one aspect, the thermoplastic polymer comprises from about 20 wt. % to about 50 wt. % of the inventive polymer composition, for example, about 20, 22, 24, 26, 28, 30, 32, 34, 36, 38, 40, 42, 44, 46, 48, or 50 wt. %.

In another aspect, the thermoplastic polymer comprises two or more individual thermoplastic materials having different intrinsic viscosities ranging from about 0.5 to about 1.5. In still other aspects, the thermoplastic composition and/or the polymer composition comprising the thermoplastic polymer can be heat resistant and/or flame retardant.

Stainless Steel Fiber

The inventive polymer composition comprises a stainless steel fiber. In one aspect, the stainless steel fiber can comprise any stainless steel fiber or combination of stainless steel fibers suitable for use in the inventive polymer composition or for an intended application.

In one aspect, the stainless steel fiber comprises from about 5 wt. % to about 30 wt. % of the inventive polymer composition, for example, about 5, 6, 7, 8, 9, 10, 11, 12, 13, 14, 15, 16, 17, 18, 19, 20, 21, 22, 23, 24, 25, 26, 27, 28, 29, or 30 wt. % of the composition.

The composition of a stainless steel fiber can vary, and the present invention is not intended to be limited to any particular stainless steel composition. In one aspect, the stainless steel fiber comprises one or more stainless steel alloys and/or alloys thereof, such as, for example, AISI 302, AISI 304, AISI 310, AISI 316L, AISI 330, AISI 406, AISI 430, AISI 446, AISI 601, AISI 630, AISI 904L, or a combination thereof. In one aspect, all or a portion of the stainless steel fiber can comprise a coating, such as, for example, a polysulfone coating, a polyester coating, or a combination thereof. In a further aspect, the stainless steel fiber comprises a coating, wherein the fiber comprises from about 50 wt. % to about 95 wt. % steel, for example, about 50, 55, 60, 65, 70, 75, 80, 85, 90, or 95 wt. % steel, and from about 5 wt. % to about 50 wt. % of a coating, for example, about 5, 10, 15, 20, 25, 30, 35, 40, 45, or 50 wt. % of a coating. In other aspects, a coating can comprise less than about 5 wt. % or greater than about 50 wt. % of the stainless steel fiber and coating composition, and the present invention is not intended to be limited to any particular coating concentration. In an exemplary aspect, the stainless steel fiber can comprise a coating, wherein the fiber comprises about 75 wt. % steel and about 25 wt. % of a coating. In yet another aspect, a stainless steel fiber can comprise about 75 wt. % of a fiber, about 9.25 wt. % of a polyester material, and about 15.75 wt. % of a polysulfone coating. In a specific aspect, the stainless steel fiber comprises a Huitong HT-CH75-T20 stainless steel fiber.

The morphology of a stainless steel fiber, for example, diameter, length, shape, and aspect ratio, of the stainless steel fiber can vary, and the present invention is not intended to be limited to any particular morphology. In one aspect, the stainless steel fiber can have a diameter of from about 0.5 µm to about 12 µm, for example, about 0.5, 0.6, 0.7, 0.8, 0.9, 1.0, 1.1, or 1.2 µm. In another aspect, the stainless steel fiber can have a diameter of from about 0.5 µm to about 12 µm, for example, about 0.5, 1, 2, 3, 4, 5, 6, 7, 8, 9, 10, 11, 12 µm. In one aspect, the stainless steel fiber can have a length of from about 0.1 mm to about 12 mm, prior to processing, for example, about 0.1, 0.2, 0.3, 0.4, 0.6, 0.8, 1, 1.5, 2, 2.5, 3, 3.5, 4, 5, 6, 7, 8, 9, 10, 11, or 12 mm. In another aspect, the stainless steel fiber can have a length about 0.1, 0.2, 0.3, 0.4, 0.5, 0.6, 0.7, 0.8, 0.9, 1, 2, 3, 4, 5, 6, 7, 8, 9, 10, 11, 12 mm, prior to processing. In another aspect, the stainless steel fiber can have a length of from about 0.1 mm to about 3 mm, for example, about 0.1, 0.2, 0.3, 0.4, 0.5, 0.6, 0.7, 0.8, 0.9, 1, 1.2, 1.4, 1.6, 1.8, 2, 2.2, 2.4, 2.6, 2.8, or 3 mm, after undergoing processing in an extruder. In one aspect, the stainless steel fiber comprises an aspect ratio of from about 100 to about 1,000, for example, about 100, 150, 200, 250, 300, 400, 500, 600, 700, 800, 900, or 1,000. In other aspects, the length, diameter, and/or aspect ratio can be less than or greater than any value specifically recited herein, and the present invention is not intended to be limited to any particular length, diameter, and/or aspect ratio values.

Glass Fiber

The invention polymer composition can optionally comprise a portion of glass fiber. In one aspect, the inventive polymer composition does not comprise a portion of glass fiber. In another aspect, the inventive polymer composition comprises a portion of glass fiber ranging, for example, up to about 30 wt. % of the polymer composition. In another aspect, the polymer composition comprises about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt. % of glass fiber.

The specific chemical composition, size, and morphology or a glass fiber, if present, can vary, and the present invention is not intended to be limited to any particular glass fiber. In one aspect, the diameter of the fiber may range from 5 to 35 µm. In another aspect, the diameter of the glass fibers may range from 10 to 20 µm. In one aspect, the polymer composition comprises a glass fiber that is a bonding glass fiber of about 13 µm, suitable for use in PBT applications. In this area where a thermoplastic resin is reinforced with glass fibers in a composite form, fibers having a length of 0.4 mm are generally referred to long fibers, and shorter ones are referred to short fibers. In one aspect, the glass fibers have a length of about 0.4 mm or shorter. In another aspect, the glass fibers have a length of about 0.5 mm or longer. In another aspect, the glass fibers have a length of 1 mm or longer. In a further aspect, the fibers have a length of 2 mm or longer. In another aspect, the inventive polymer composition comprises a portion of glass fiber, glass flake, glass beads or a combination thereof. In another aspect, the glass fiber used in the invention may be selected from E-glass, S-glass, AR-glass, T-glass, D-glass, R-glass, or a combination thereof.

Conductive Filler

The inventive polymer composition can optionally comprise a conductive filler. In one aspect, the inventive polymer composition does not comprise a conductive filler. In another aspect, the inventive polymer composition comprises a conductive filler, ranging up to about 15 wt. % of the composition. In another aspect, the polymer composition comprises about 1, 2, 3, 4, 5, 6, 7, 8, 9, 10, 11, 12, 13, 14, or 15 wt. % of a conductive filler.

The specific chemical composition, size, and morphology or a conductive filler, if present, can vary, and the present invention is not intended to be limited to any particular conductive filler. In one aspect, the polymer composition comprises a conductive filler, such as, for example, a carbon black. In another aspect, the conductive filler can comprise a particulate carbonaceous material, such as, for example, a furnace carbon black, a thermal black, a surface modified carbon black, a heat treated carbon black, an activated carbon, a graphite, carbon fibers, carbon nanotubes or a combination thereof. In another aspect the conductive filler comprises a metal or metal-clad filler, such as, for example, silver-plated aluminium, nickel-coated graphite, silver-plated copper, silver, silver-coated glass, or a combination thereof. In another aspect, the conductive filler can comprise a low or high surface area conductive carbon black. In another aspect, the conductive filler comprises a carbon black exhibiting a BET surface area from about at least 50 $m^2/g$. In another aspect, the conductive filler comprises a carbon black exhibiting an oil absorption from about at least 100 ml/100 g. In a specific aspect, the conductive filler comprises an ENSACO® 250 carbon powder, available from Earache Europe. In other aspects, the conductive filler can comprise one or more conductive particulate materials not specifically recited herein.

Second Polymer

The inventive polymer composition can optionally comprise a second polymer in addition to the thermoplastic polymer described above. In one aspect, the inventive polymer composition does not comprise a second polymer. In another aspect, a second polymer is present and all or a portion thereof is crystalline or at least semi-crystalline. In another aspect, the inventive polymer composition comprises a second polymer, ranging up to about 15 wt. % of the composition. In another aspect, the polymer composition comprises about 1, 2, 3, 4, 5, 6, 7, 8, 9, 10, 11, 12, 13, 14, or 15 wt. % of a second polymer.

The specific chemical composition of a second polymer, if present, can vary and the present invention is not intended to be limited to any particular second polymer. In one aspect, the inventive polymer composition comprises a second polymer, such as, for example, a polyester having a different intrinsic viscosity than the thermoplastic polymer. In yet another aspect, the second polymer, if present, should be chemically compatible with the thermoplastic polymer, stainless steel fiber, and any optional components that can be present.

In one aspect, the second polymer comprises a PBT having a different intrinsic viscosity than the thermoplastic, a polyethylene terephthalate (PET), a polytrimethylene terephthalate (PTT), polyethylene naphthalate (PEN), poly 1,4-cyclohexylene dimethylene terephthalate (PCT) or a combination thereof. In another aspect, the second polymer comprises an aromatic polyester. In another aspect, the second polymer comprises polyethylene terephthalate (PET), polybutylene terephthalate (PBT), polytrimethylene terephthalate (PTT), polyethylene naphthalate (PEN), poly 1,4-cyclohexylene dimethylene terephthalate (PCT), or a combination thereof. In yet another aspect, the second polymer can comprise a compound having a ring structure similar to PBT, such as, for example, PET, PTT, PEN, PCT, or a combination thereof. In yet another aspect, the second polymer can comprise one or more additional compounds not specifically recited herein, and the present invention is not intended to be limited to any particular second polymer composition.

Other Additives

The inventive polymer composition can also optionally comprise one or more additives, such as, for example, impact modifiers, flame retardants, colorants, and primary and/or secondary antioxidants. In one aspect, one or more such additives, if present, can comprise up to about 15 wt. % of the composition, for example, about 1, 2, 3, 4, 5, 6, 7, 8, 9, 10, 11, 12, 13, 14, or 15 wt. %.

Properties of Improved Polymer Composition

In various aspects, the inventive polymer composition can have improved EMI retention and exhibit a higher heat deflection temperature and improved mechanical properties after annealing as compared to a control sample not comprising the inventive polymer composition. In a specific example, a polymer composition comprising a PBT thermoplastic and 3 wt. % PET exhibited only a 5.11% EMI drop after annealing at 150° C. for 168 hours.

In various aspects, the inventive polymer composition can retain at least about 80%, 85%, 90%, 95%, or more of the initial EMI after annealing at 150° C. for about 120 hours. In various aspects, the inventive polymer composition can retain at least about 80%, 85%, 90%, 95%, or more of the initial EMI after annealing at 150° C. for about 168 hours. In one aspect, the inventive polymer composition retains at least about 80% of the initial EMI (i.e., before annealing), for example, about 80, 82, 84, 86, 88, 90, 92, 94, 96, 98%, or more, after annealing at 150° C. for at least about 120 hours. In another aspect, the inventive polymer composition retains at least about 85% of the initial EMI (i.e., before annealing), for example, at least about 85, 87, 89, 91, 93, 95, 97, 99%, or more after annealing at 150° C. for at least about 120 hours. In another aspect, the inventive polymer composition retains at least about 90% of the initial EMI (i.e., before annealing), for example, at least about 90, 91, 92, 93, 94, 95, 96, 97, 98%, or more after annealing at 150° C. for at least about 120 hours. In another aspect, the inventive polymer composition retains at least about 95% of the initial EMI (i.e., before annealing), for example, at least about 95, 96, 97, 98, 99%, or more after annealing at 150° C. for at least about 120 hours.

In other aspects, the compositions of the present invention can exhibit no or little EMI drop with a change, for example, increase, in thickness of the composition. For example, the thickness of a thermoplastic composition or article formed therefrom can be increased while maintaining at least about 85%, at least about 90%, at least about 95%, at least about 97%, at least about 98%, at least about 99%, or more of EMI performance, as compared to a thinner composition or article.

While typical aspects have been set forth for the purpose of illustration, the foregoing descriptions should not be deemed to be a limitation on the scope of the invention. Accordingly, various modifications, adaptations, and alternatives can occur to one skilled in the art without departing from the spirit and scope of the present invention.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

For each of the following examples, samples were prepared by melt extrusion on a Toshiba twin screw extruder using nominal melt temperatures of about 260° C. and 140 rpm. In addition, tests were conducted in accordance with ISO standards, as described in the tests below:

| Test | Method |
| --- | --- |
| Izod Impact, unnotched 80 × 10 × 4 mm, +23° C. | ISO 180/1U |
| Izod Impact, notched 80 × 10 × 4 mm, +23° C. | ISO 180/1A |
| Heat Deflection Temperature/Af, 1.8 MPa Flatwise 80 × 10 × 4 mm, sp = 64 mm | ISO 75/Af |
| Density | ISO 1183 |
| Spiral flow analysis | SABIC Method |
| Melt Volume-flow rate | ISO 1133 |
| Flexural test - 3 point | ISO 178 |
| Tensile test - uniaxial tensile | ISO 527 |
| EMI shielding testing | ASTM D4935 |
| Pftp, V0 at 1.6 mm | UL94 V-0 |

1. EMI Retention

In a first example, samples containing a conductive filler and a second crystalline polymer were test for EMI retention after annealing, as detailed in Table 1, below.

TABLE 1

| EMI Retention | | | | |
| --- | --- | --- | --- | --- |
| | Control | 2% Carbon Black | 3% PET | 3% PTT |
| Initial EMI (dB) | 61.55 | 60.95 | 60.65 | 59.7 |
| After annealing at 150° C. for 8 hours | 59.25 | 59 | 59.7 | 58.2 |
| After annealing at 150° C. for 24 hours | 57.75 | 57.15 | 59.2 | 57.1 |
| After annealing at 150° C. for 72 hours | 57.25 | 56.3 | 58.45 | 56.9 |
| After annealing at 150° C. for 120 hours | 46.45 | 53.85 | 58.2 | 54.35 |
| After annealing at 150° C. for 168 hours | 45.55 | 53.9 | 57.55 | 53.9 |

In Table 1, the EMI drop is illustrated after annealing. While the control sample exhibited a notable EMI drop, the inventive samples exhibited a significantly smaller drop, indicating improved EMI retention. Specifically, the sample comprising 3% PET exhibited the best EMI retention.

Additional data showed that with the addition of 2% CCB, 3% PET, or 3% PTT, the inventive samples exhibited higher heat deflect temperatures and improved mechanical properties as compared to a control sample. For example, the sample comprising 3% PET exhibited only a 5.11% EMI drop after annealing at 150° C. for 168 hours.

The tested properties of each of the samples are detailed in Table 2, below.

TABLE 2

Test Properties of Control and Inventive Samples

|  |  |  | Value | | | |
| --- | --- | --- | --- | --- | --- | --- |
| Properties | Standard | Unit | Control | 2% CCB | 3% PET | 3% PTT |
| Specific Gravity | ISO 1183 | g/cm³ | 1.67 | 1.67 | 1.68 | 1.68 |
| Izod Impact, notched 23° C. | ISO 180 | J/m | 8.52 | 8.48 | 8.62 | 8.15 |
| Melt Volume Rate, MVR at 270° C./10 kg | ISO 1133 | cm³/10 min | 5.22 | 5.08 | 1.54 | 7.88 |
| Flexural Modulus | ISO 178 | MPa | 6099.20 | 6145.20 | 6145.20 | 6290.80 |
| Flexural Strength | ISO 178 | MPa | 130.98 | 131.80 | 133.92 | 134.38 |
| Flexural Strain at Break | ISO 178 | % | 3.06 | 3.30 | 3.26 | 2.98 |
| Tensile Modulus | ISO 527 | MPa | 6030.60 | 6018.60 | 6077.60 | 6231.40 |
| Tensile Stress at Break | ISO 527 | MPa | 74.70 | 76.90 | 75.90 | 77.40 |
| Elongation at Break | ISO 527 | % | 2.10 | 2.30 | 2.10 | 2.10 |
| HDT, 1.8 MPa, 6.4 mm, unannealed | ISO 75 | ° C. | 157.17 | 173.73 | 167.67 | 160.63 |
| Shielding Effectiveness @ 1.2 mm | ASTM D4935 | dB | 46.45 | 43.60 | 42.60 | 45.76 |
| Shielding Effectiveness @ 1.5 mm | ASTM D4935 | dB | 52.70 | 49.60 | 52.60 | 51.05 |
| Shielding Effectiveness @ 3 mm | ASTM D4935 | dB | 61.55 | 60.95 | 60.65 | 59.70 |
| Shielding Effectiveness @ 3 mm, after annealing at 150° C. × 8 hrs | ASTM D4935 | dB | 59.25 | 59.00 | 59.70 | 58.20 |
|  |  | drop rate, % | 3.74 | 3.20 | 1.57 | 2.51 |
| Shielding Effectiveness @ 3 mm, after annealing at 150° C. × 24 hrs | ASTM D4935 | dB | 57.75 | 57.15 | 59.20 | 57.10 |
|  |  | drop rate, % | 6.17 | 6.23 | 2.39 | 4.36 |
| Shielding Effectiveness @ 3 mm, after annealing at 150° C. × 72 hrs | ASTM D4935 | dB | 57.25 | 56.30 | 58.45 | 56.90 |
|  |  | drop rate, % | 6.99 | 7.63 | 3.63 | 4.69 |
| Shielding Effectiveness @ 3 mm, after annealing at 150° C. × 120 hrs | ASTM D4935 | dB | 46.45 | 53.85 | 58.20 | 54.35 |
|  |  | drop rate, % | 24.53 | 11.65 | 4.04 | 8.96 |
| Shielding Effectiveness @ 3 mm, after annealing at 150° C. × 168 hrs | ASTM D4935 | dB | 45.55 | 53.90 | 57.55 | 53.90 |
|  |  | drop rate, % | 26.00 | 11.57 | 5.11 | 9.72 |

As detailed in Table 2, above, blends of PBT with different intrinsic viscosity as base resin, incorporated flat glass fiber, conductive filler, and a second crystalline polymer with stainless steel fiber, we can get composites with better EMI retention after annealing at high temperature while maintaining one or more mechanical, flow, and/or thermal properties.

2. EMI Analysis

In a second example, inventive samples were prepared and subjected to EMI testing before and after annealing at 150° C. for various periods of time. Table 3 details the results of this analysis. Each of a control sample, a sample with 2% conductive carbon black (CCB), 3% polyethylene terephthalate (PET), and 3% polytrimethylene terephthalate (PTT) were prepared and evaluated.

TABLE 3

|  |  | Frequency (MHz) | | | | | |
| --- | --- | --- | --- | --- | --- | --- | --- |
|  |  | 30 | 250 | 500 | 750 | 1,000 | 1,500 |
| Control | Initial | 55.6 | 60.0 | 61.8 | 62.0 | 62.4 | 61.4 |
|  | After annealing at 150° C. for 8 hrs | 55.2 | 57.0 | 59.0 | 60.4 | 60.6 | 61.0 |
|  | After annealing at 150° C. for 24 hrs | 51.6 | 55.8 | 57.4 | 59.0 | 58.8 | 59.6 |
|  | After annealing at 150° C. for 72 hrs | 53.2 | 55.4 | 56.8 | 58.6 | 58.2 | 59.6 |
|  | After annealing at 150° C. for 120 hrs | 47.4 | 47.6 | 46.4 | 46.2 | 45.6 | 47.4 |
|  | After annealing at 150° C. for 168 hrs | 46.8 | 48.2 | 45.2 | 44.4 | 44.4 | 46.2 |
| 2% CCB | Initial | 54.2 | 60.2 | 61.2 | 61.0 | 61.4 | 61.6 |
|  | After annealing at 150° C. for 8 hrs | 53.6 | 56.4 | 58.4 | 60.6 | 60.6 | 61.0 |
|  | After annealing at 150° C. for 24 hrs | 52.8 | 55.2 | 56.2 | 58.6 | 58.6 | 59.8 |
|  | After annealing at 150° C. for 72 hrs | 51.4 | 54.6 | 56.0 | 57.2 | 57.4 | 59.2 |
|  | After annealing at 150° C. for 120 hrs | 51.2 | 52.8 | 53.2 | 54.6 | 54.8 | 56.8 |
|  | After annealing at 150° C. for 168 hrs | 51.2 | 52.4 | 53.4 | 55.2 | 54.6 | 56 |
| 3% PET | Initial | 55.6 | 60.0 | 60.6 | 61.0 | 61.0 | 60.4 |
|  | After annealing at 150° C. for 8 hrs | 54.0 | 57.8 | 59.2 | 61.0 | 60.8 | 60.4 |

TABLE 3-continued

| | | Frequency (MHz) | | | | | |
|---|---|---|---|---|---|---|---|
| | | 30 | 250 | 500 | 750 | 1,000 | 1,500 |
| | After annealing at 150° C. for 24 hrs | 55.4 | 57.0 | 58.6 | 60.8 | 60.4 | 60.8 |
| | After annealing at 150° C. for 72 hrs | 54.2 | 56.6 | 58.0 | 59.4 | 59.8 | 60.6 |
| | After annealing at 150° C. for 120 hrs | 53.6 | 56.6 | 57.8 | 59.4 | 59 | 59.8 |
| | After annealing at 150° C. for 168 hrs | 54.2 | 56 | 57 | 58.6 | 58.6 | 59.6 |
| 3% PTT | Initial | 54.8 | 57.6 | 59.8 | 60.4 | 61.0 | 60.4 |
| | After annealing at 150° C. for 8 hrs | 55.0 | 56.4 | 57.2 | 60.0 | 59.2 | 60.2 |
| | After annealing at 150° C. for 24 hrs | 52.4 | 54.8 | 56.8 | 58.6 | 58.2 | 58.8 |
| | After annealing at 150° C. for 72 hrs | 53.2 | 56.0 | 56.2 | 58.0 | 57.4 | 58.8 |
| | After annealing at 150° C. for 120 hrs | 52.2 | 54 | 54 | 54.8 | 54.6 | 55.8 |
| | After annealing at 150° C. for 168 hrs | 52.2 | 53.8 | 53.2 | 54.8 | 53.8 | 54.8 |

Figure 1:
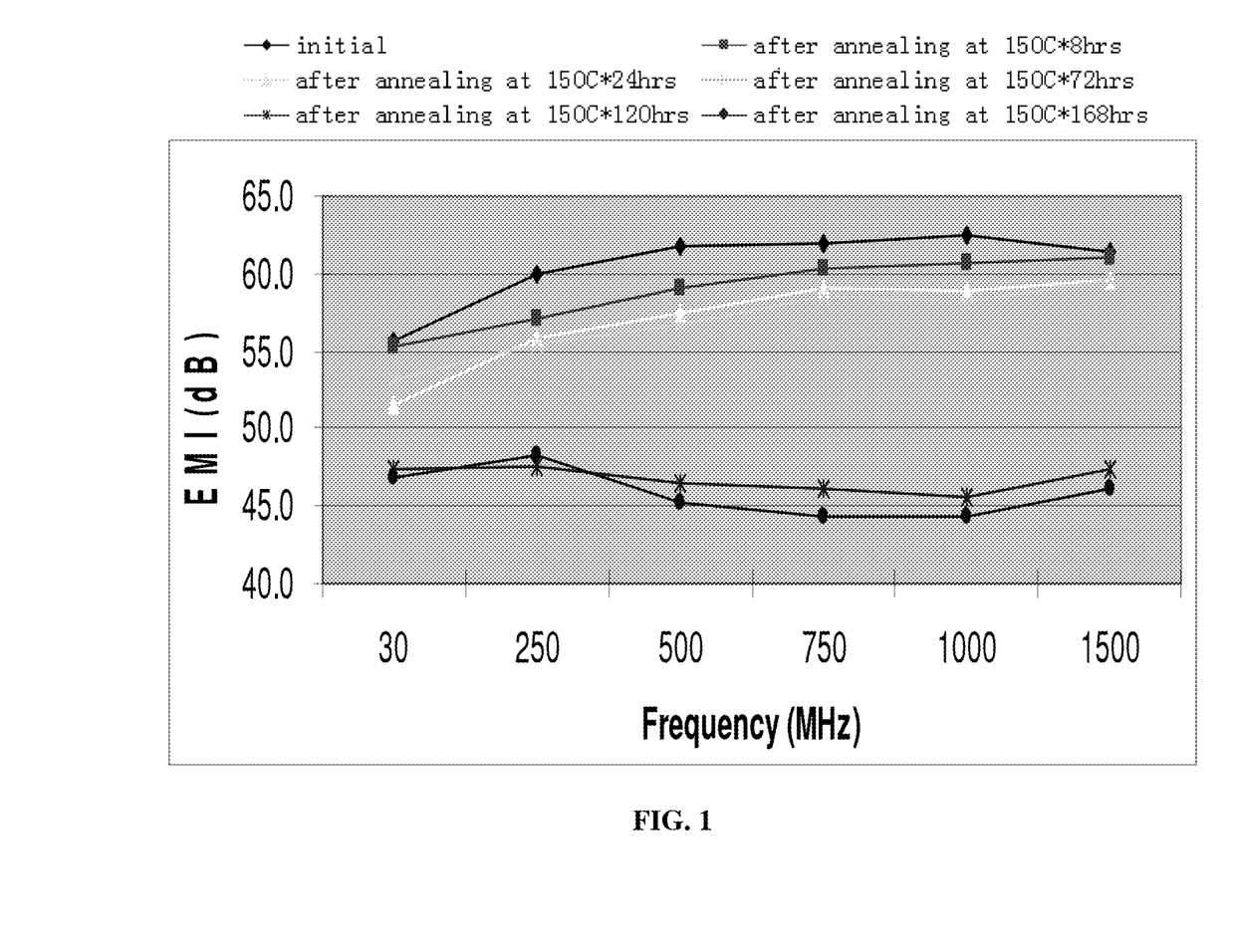
FIG. 1 illustrates the EMI profiles of control sample before and after the annealing process.
Figure 2:
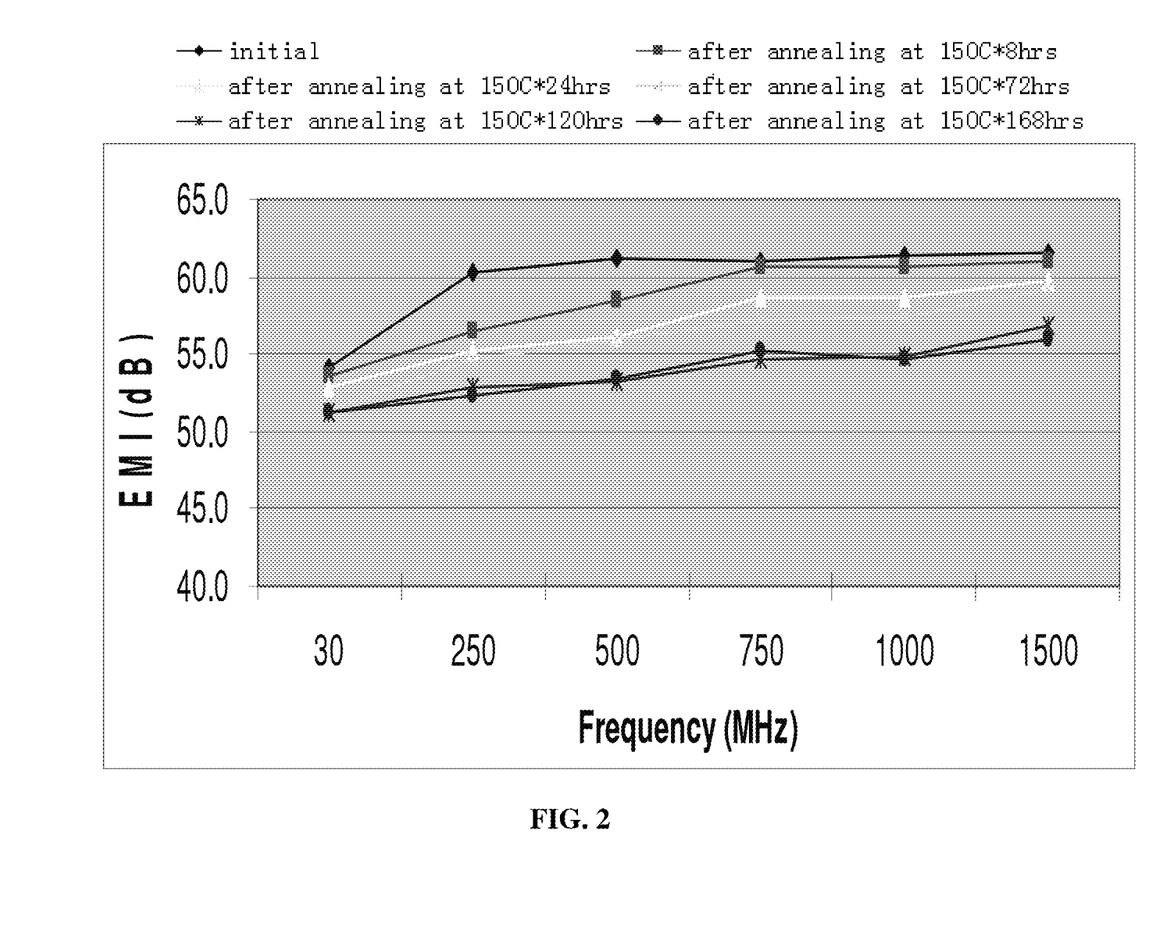
FIG. 2 illustrates the EMI profiles of inventive sample with addition of 2% conductive carbon black filler before and after the annealing process.
Figure 3:
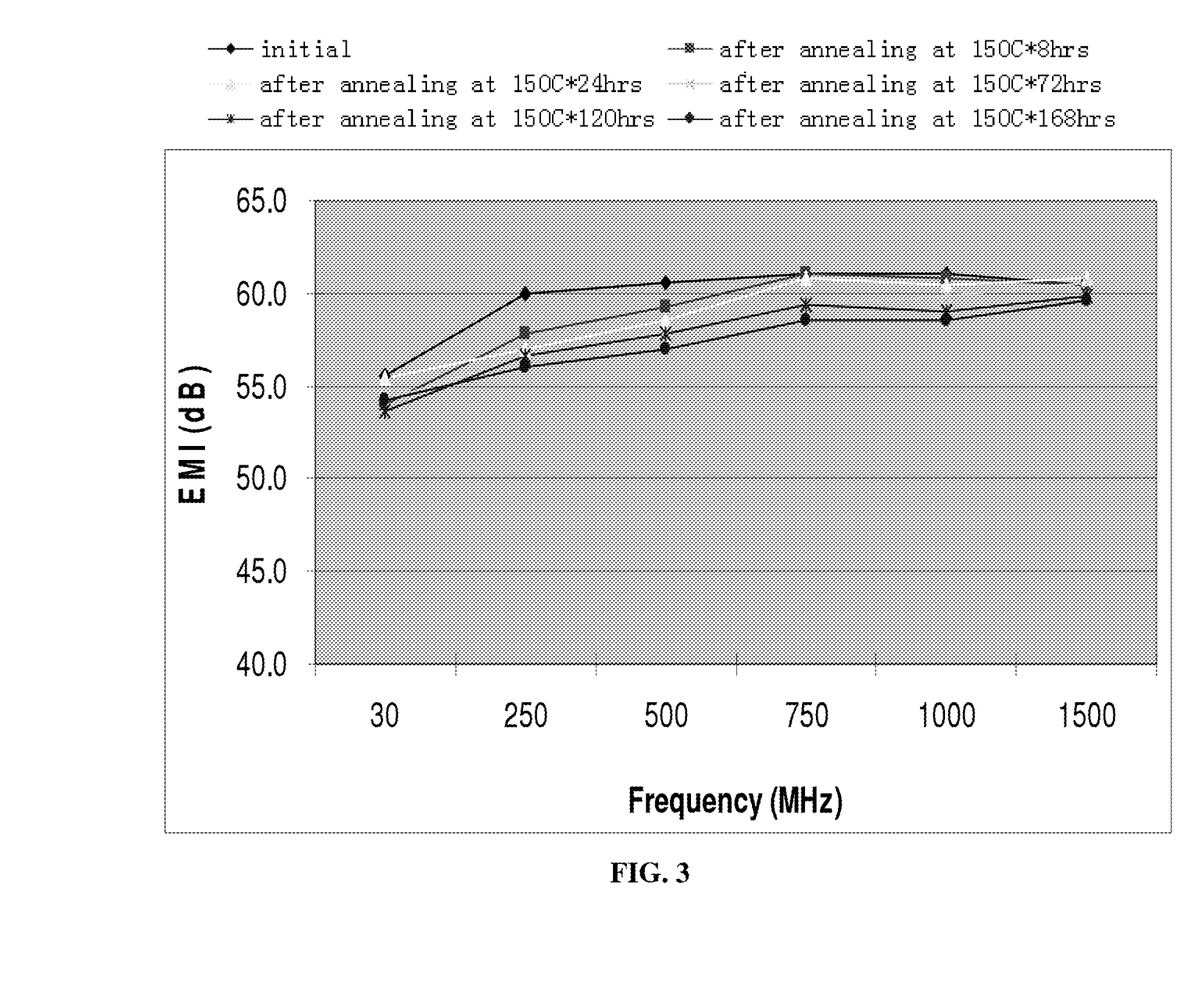
FIG. 3 illustrates the EMI profiles of inventive sample with addition of 3% polyethylene terephthalate (PET) before and after the annealing process.
Figure 4:
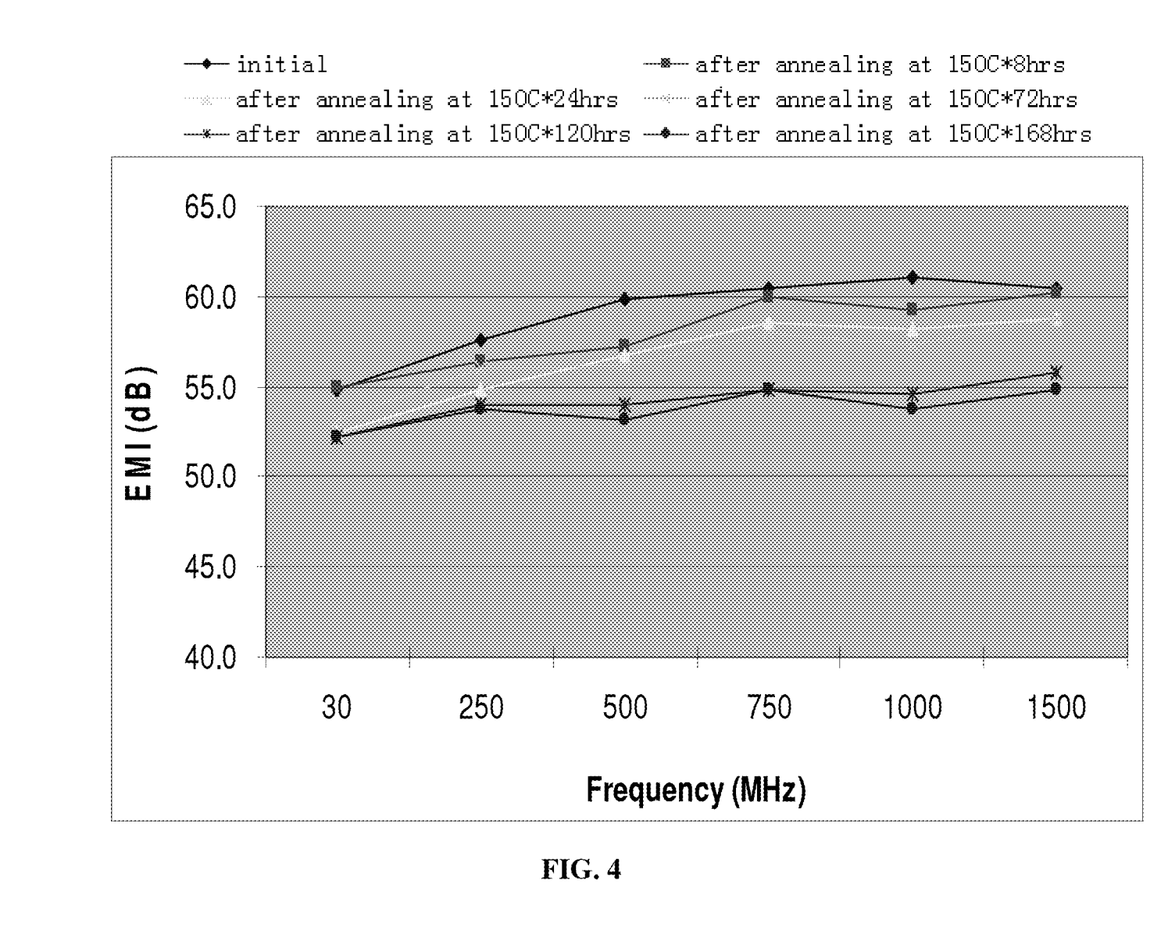
FIG. 4 illustrates the EMI profiles of inventive sample with addition of 3% polytrimethylene terephthalate (PTT) before and after the annealing process.

FIG. 1 illustrates the EMI profiles of a control sample before and after the annealing process. FIG. 2 illustrates the EMI profiles of inventive sample with addition of 2% conductive carbon black filler before and after the annealing process. FIG. 3 illustrates the EMI profiles of inventive sample with addition of 3% polyethylene terephthalate (PET) before and after the annealing process. FIG. 4 illustrates the EMI profiles of inventive sample with addition of 3% polytrimethylene terephthalate (PTT) before and after the annealing process.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A polymer composition comprising:
    from about 20 wt. % to about 50 wt. % of a thermoplastic polymer;
    from about 5 wt. % to about 30 wt. % of a coated fiber;
    wherein the coated fiber comprises about 75 wt. % of a stainless steel fiber, about 9.25 wt. % of a polyester material coating and about 15.75 wt. % of a polysulfone coating.

2. The polymer composition of claim 1, wherein the thermoplastic polymer is semi-crystalline.

3. The polymer composition of claim 1, wherein the thermoplastic polymer comprises a polybutylene terephthalate, nylon, or a combination thereof.

4. The polymer composition of claim 1, wherein the thermoplastic polymer comprises polybutylene terephthalate.

5. The polymer composition of claim 1, wherein the thermoplastic polymer has an intrinsic viscosity ranging from about 0.5 to about 1.5.

6. The polymer composition of claim 1, wherein the thermoplastic polymer comprises two or more of polybutylene terephthalate, polyphthalamide, or nylon, wherein at least two of the polybutylene terephthalate, polyphthalamide, or nylon have a different intrinsic viscosity.

7. The polymer composition of claim 1, capable of retaining at least about 80% of the initial electromagnetic interference after annealing at about 150° C. for at least about 120 hours.

* * * * *